US009386503B2

(12) United States Patent
Trang et al.

(10) Patent No.: US 9,386,503 B2
(45) Date of Patent: Jul. 5, 2016

(54) ROUTING OF LONG-LIVED TRAFFIC WHEN USING SIPTO

(71) Applicant: Sony Corporation, Tokyo (JP)

(72) Inventors: Linh Trang, Lund (SE); Anders Berggren, Lund (SE); Rui Nunes, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 91 days.

(21) Appl. No.: 14/147,255

(22) Filed: Jan. 3, 2014

(65) Prior Publication Data
US 2015/0195767 A1    Jul. 9, 2015

(51) Int. Cl.
*H04W 40/20* (2009.01)
*H04W 36/00* (2009.01)
*H04W 40/36* (2009.01)
*H04W 76/02* (2009.01)
(Continued)

(52) U.S. Cl.
CPC .............. *H04W 40/20* (2013.01); *H04L 45/38* (2013.01); *H04W 36/0027* (2013.01); *H04W 40/36* (2013.01); *H04W 76/025* (2013.01); *H04W 76/068* (2013.01); *H04W 8/12* (2013.01); *H04W 48/17* (2013.01); *H04W 88/02* (2013.01); *H04W 88/16* (2013.01)

(58) Field of Classification Search
None
See application file for complete search history.

(56) References Cited

U.S. PATENT DOCUMENTS 7,185,067 B1 *  2/2007  Viswanath et al. ........... 709/217
8,059,599 B1 * 11/2011  Rogers et al. ................. 370/331
(Continued)

FOREIGN PATENT DOCUMENTS

WO      2011098249 A2    8/2011

OTHER PUBLICATIONS

"3rd Generation Partnership Project: Technical Specification Group SA Study on Co-ordinated PGW change for Selected IP Traffic Offload (CSIPTO) (Release 13)", 3GPP Draft; S1-140278 TR22 828V0.2.0CLEAN, 3rd Generation Partnership Project (3GPP), Mobile Competence Centre; 650, Route de Lucioles; F-06921 Sophia Antipolils Cedex; France; Jan. 28, 2014, XP050764151, Retrieved from the Internet: URL:http://www.3gpp.org/ftp/tsg_sa/WG1_Serv/TSGS1_65_Taipei/docs/ [retrieved on Jan. 28, 2014].

(Continued)

*Primary Examiner* — Brian Roberts
(74) *Attorney, Agent, or Firm* — James C. Edwards; Moore & Van Allen PLLC

(57) ABSTRACT

Embodiments of the invention are directed to systems, methods and computer program products for routing traffic in a packet data network (PDN). A method includes determining whether the mobile device has an active long-lived data traffic session over an original PDN connection between the mobile device and a first PDN gateway (P-GW); if the mobile device has an active long-lived data traffic session, then routing any new long-lived data traffic session over the original PDN connection; and if the mobile device does not have an active long-lived data traffic session, then routing any new long-lived data traffic session over a location-based PDN connection established based at least in part on a current location of the mobile device. In other words, the mobile device initiates and maintains all long-lived data sessions (for which service continuity is essential) to only one PDN connection.

20 Claims, 5 Drawing Sheets

(51) Int. Cl.
  *H04W 76/06* (2009.01)
  *H04L 12/721* (2013.01)
  *H04W 88/02* (2009.01)
  *H04W 88/16* (2009.01)
  *H04W 48/00* (2009.01)
  *H04W 8/12* (2009.01)

(56) References Cited

U.S. PATENT DOCUMENTS

2010/0124198 A1* 5/2010 Wong .................. 370/329
2011/0007748 A1* 1/2011 Yin et al. ............. 370/401
2012/0265888 A1* 10/2012 Roeland et al. ...... 709/228
2012/0307799 A1* 12/2012 Taleb et al. .......... 370/331
2014/0169332 A1* 6/2014 Taleb et al. .......... 370/331

OTHER PUBLICATIONS

"3rd Generation Partnership Project: Technical Specification Group SA Study on Co-ordinated PGW change for Selected IP Traffic Offload (CSIPTO) (Release 13)", 3GPP Draft; S1-135235 Draft FS_CSIPTO TR22.828 0.1.0, 3rd Generation Partnership Project (3GPP), Mobile Competence Centre; 650, Route de Lucioles; F-06921 Sophia Antipolis Cedex; France; Nov. 18, 2013, XP050763824, Retrieved from the Internet: URL:http://www.3gpp.org/ftp/tsg_sa/WG1_Serv/TSGS1_64_SanFrancisco/docs/ [retrieved on Nov. 18, 2013].

International Search Report and Written Opinion; Apr. 1, 2015; issued in International Patent Application No. PCT/EP2014/077925.

* cited by examiner

ROUTING OF LONG-LIVED TRAFFIC WHEN USING SIPTO

BACKGROUND

In modern cellular networks, both short-lived (e.g., web browsing) and long-lived (e.g., VoLTE call, streaming, etc.) data traffic sessions (i.e., flows) may be routed to a particular packet data network (PDN) gateway (P-GW) and then re-routed to a new P-GW as the user equipment (UE) such as a user mobile device when the UE moves between different cluster areas. However, re-routing long-lived flows is typically impossible as they require service continuity. Further, establishing new connections to new P-GWs as the UE travels from cluster to cluster may result in new long-lived (and short-lived flows) being routed to multiple different P-GWs.

BRIEF SUMMARY

Embodiments of the invention are directed to systems, methods and computer program products for routing traffic in a packet data network (PDN). A method includes determining, by a mobile device, whether the mobile device has an active long-lived data traffic session over an original PDN connection between the mobile device and a first PDN gateway (P-GW); if the mobile device has an active long-lived data traffic session, then routing any new long-lived data traffic session over the original PDN connection; and if the mobile device does not have an active long-lived data traffic session, then routing any new long-lived data traffic session over a location-based PDN connection established based at least in part on a current location of the mobile device.

In some embodiments, the method includes determining, by the mobile device, location information including location data indicating the current location of the mobile device; determining, by the mobile device, a second PDN gateway (P-GW) corresponding to the determined current location of the mobile device; determining, by the mobile device, that an active short-lived data traffic session over the original PDN connection exists; initiating connecting, by the mobile device, the mobile device to the second P-GW, thereby resulting in the location-based PDN connection; and re-routing the active short-lived data traffic session over the location-based PDN connection. In some such embodiments, the method also includes, as long as the mobile device has an active long-lived data traffic session over the original PDN connection, routing, by the mobile device, any new long-lived data traffic session over the original PDN connection.

In some embodiments, the method includes determining, by the mobile device, location information including location data indicating the current location of the mobile device; determining, by the mobile device, a second PDN gateway (P-GW) corresponding to the determined current location of the mobile device; determining, by the mobile device, that a short-lived data traffic session over the cellular network will be initiated by the mobile device within a period of time; initiating connecting, by the mobile device, the mobile device to the second P-GW, thereby resulting in the location-based PDN connection; and routing the short-lived data traffic session over the location-based PDN connection. In some such embodiments, the method also includes, as long as the mobile device has an active long-lived data traffic session over the original PDN connection, routing, by the mobile device, any new long-lived data traffic session over the original PDN connection.

In other such embodiments, the method includes determining, by the mobile device, that the mobile device does have an active long-lived data traffic session over the original PDN connection; determining, by the mobile device, that a new long-lived data traffic session will be initiated by the mobile device within a second period of time; and, in response to determining that the new long-lived data traffic session will be initiated and that the mobile device has an active long-lived data traffic session over the original PDN connection, routing the new long-lived data traffic session over the original PDN connection. In some of these embodiments, the method also includes determining, by the mobile device, second location information including location data indicating a second current location of the mobile device; determining, by the mobile device, a third PDN gateway (P-GW) corresponding to the determined second current location of the mobile device; determining, by the mobile device, that a second short-lived data traffic session over the cellular network will be initiated by the mobile device within a third period of time; initiating connecting, by the mobile device, the mobile device to the third P-GW, thereby resulting in a second location-based PDN connection; and routing the second short-lived data traffic session over the second location-based PDN connection. In some of these embodiments, the method also includes re-routing the short-lived data traffic session over the second location-based PDN connection; and disconnecting, by the mobile device, from the second P-GW, thereby ending the location-based PDN connection. In some such embodiments, the method also includes determining, by the mobile device, that both the active long-lived data traffic session and the new long-lived data traffic session have been terminated; and disconnecting, by the mobile device, from the first P-GW, thereby ending the original PDN connection. In some of these embodiments, the method also includes routing, by the mobile device, any new long-lived data traffic session or short-lived data traffic session over the second location-based PDN connection.

In some embodiments, the method also includes, as long as the mobile device has an active long-lived data traffic session over the original PDN connection, routing, by the mobile device, any new long-lived data traffic session over the original PDN connection.

According to embodiments of the invention, a mobile device includes a memory; a processor; and a module stored in the memory for routing traffic in a packet data network (PDN), the module executable by the processor, and configured to determine whether the mobile device has an active long-lived data traffic session over an original PDN connection between the mobile device and a first PDN gateway (P-GW); if the mobile device has an active long-lived data traffic session, then route any new long-lived data traffic session over the original PDN connection; and if the mobile device does not have an active long-lived data traffic session, then route any new long-lived data traffic session over a location-based PDN connection established based at least in part on a current location of the mobile device.

In some embodiments, the module is further configured to determine location information including location data indicating the current location of the mobile device; determine a second PDN gateway (P-GW) corresponding to the determined current location of the mobile device; determine that an active short-lived data traffic session over the original PDN connection exists; initiate connecting the mobile device to the second P-GW, thereby resulting in the location-based PDN connection; and re-route the active short-lived data traffic session over the location-based PDN connection. In some of these embodiments, the module is further configured to, as long as the mobile device has an active long-lived data traffic session over the original PDN connection, routing, by the mobile device, any new long-lived data traffic session over the original PDN connection.

In some embodiments, the module is further configured to determine location information including location data indicating the current location of the mobile device; determine a second PDN gateway (P-GW) corresponding to the determined current location of the mobile device; determine that a short-lived data traffic session over the cellular network will be initiated by the mobile device within a period of time; initiate connecting the mobile device to the second P-GW, thereby resulting in the location-based PDN connection; route the short-lived data traffic session over the location-based PDN connection; and, as long as the mobile device has an active long-lived data traffic session over the original PDN connection, route any new long-lived data traffic session over the original PDN connection.

According to embodiments of the invention, a computer program product for routing traffic in a packet data network (PDN) includes a non-transitory computer-readable medium comprising a set of codes for causing a computer to determine whether the mobile device has an active long-lived data traffic session over an original PDN connection between the mobile device and a first PDN gateway (P-GW); if the mobile device has an active long-lived data traffic session, then route any new long-lived data traffic session over the original PDN connection; and, if the mobile device does not have an active long-lived data traffic session, then route any new long-lived data traffic session over a location-based PDN connection established based at least in part on a current location of the mobile device.

In some embodiments, the set of codes further causes a computer to determine location information including location data indicating the current location of the mobile device; determine a second PDN gateway (P-GW) corresponding to the determined current location of the mobile device; determine that an active short-lived data traffic session over the original PDN connection exists; initiate connecting the mobile device to the second P-GW, thereby resulting in the location-based PDN connection; and re-route the active short-lived data traffic session over the location-based PDN connection. In some such embodiments, the set of codes further causes a computer to, as long as the mobile device has an active long-lived data traffic session over the original PDN connection, routing, by the mobile device, any new long-lived data traffic session over the original PDN connection.

In some embodiments, the set of codes further causes a computer to determine location information including location data indicating the current location of the mobile device; determine a second PDN gateway (P-GW) corresponding to the determined current location of the mobile device; determine that a short-lived data traffic session over the cellular network will be initiated by the mobile device within a period of time; initiate connecting the mobile device to the second P-GW, thereby resulting in the location-based PDN connection; route the short-lived data traffic session over the location-based PDN connection; and, as long as the mobile device has an active long-lived data traffic session over the original PDN connection, route any new long-lived data traffic session over the original PDN connection.

BRIEF DESCRIPTION OF THE DRAWINGS

Figure 1:
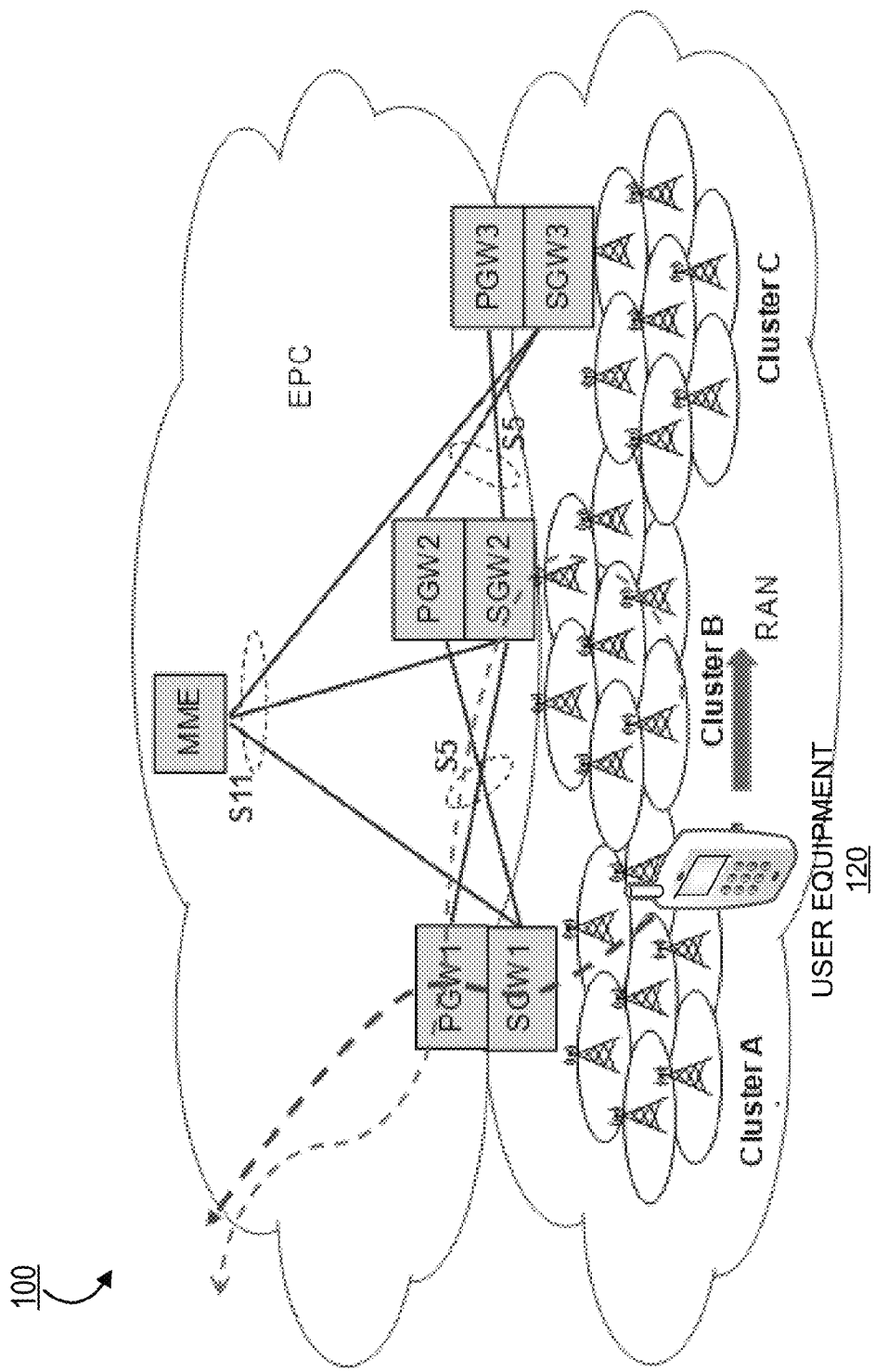
Figure 2:
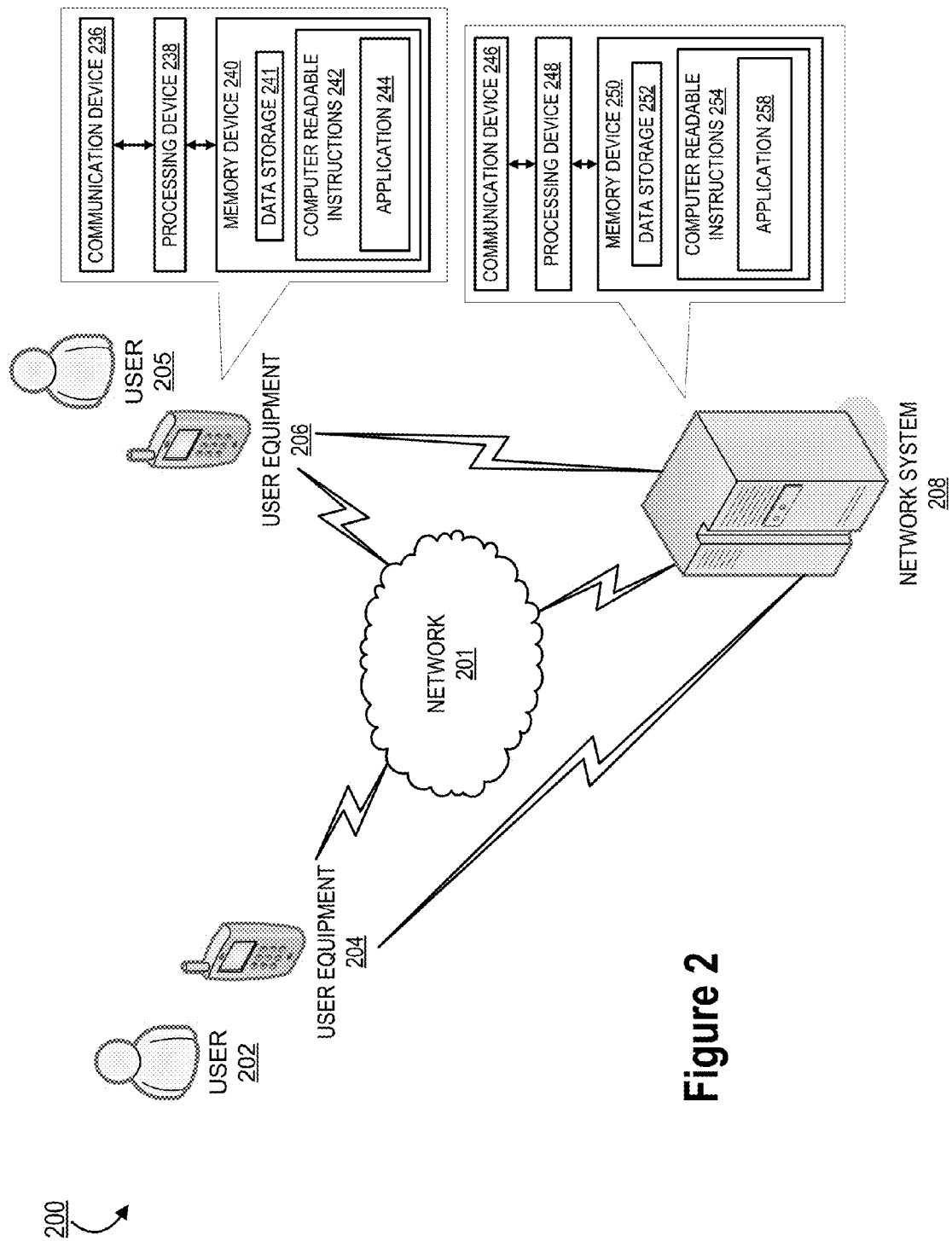
Figure 3:
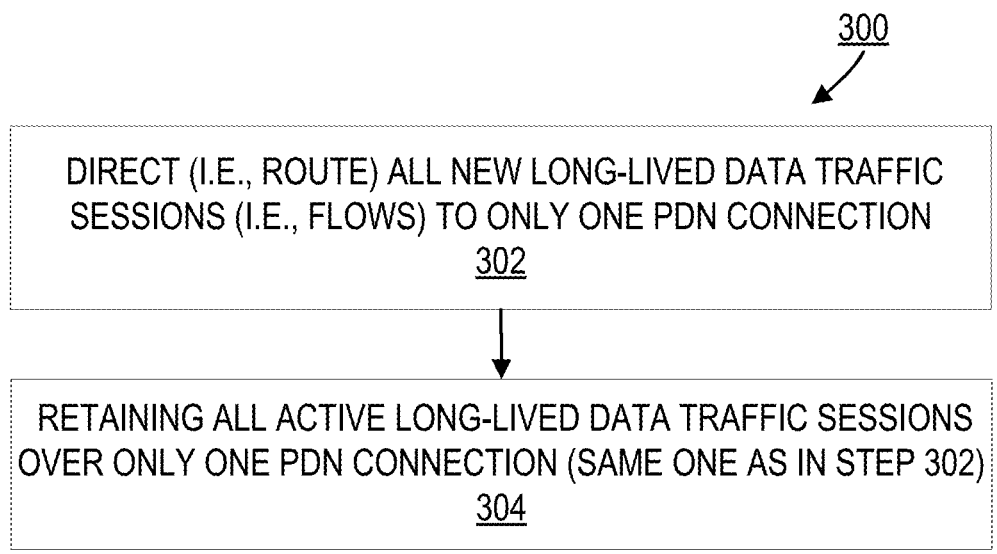
Figure 4A:
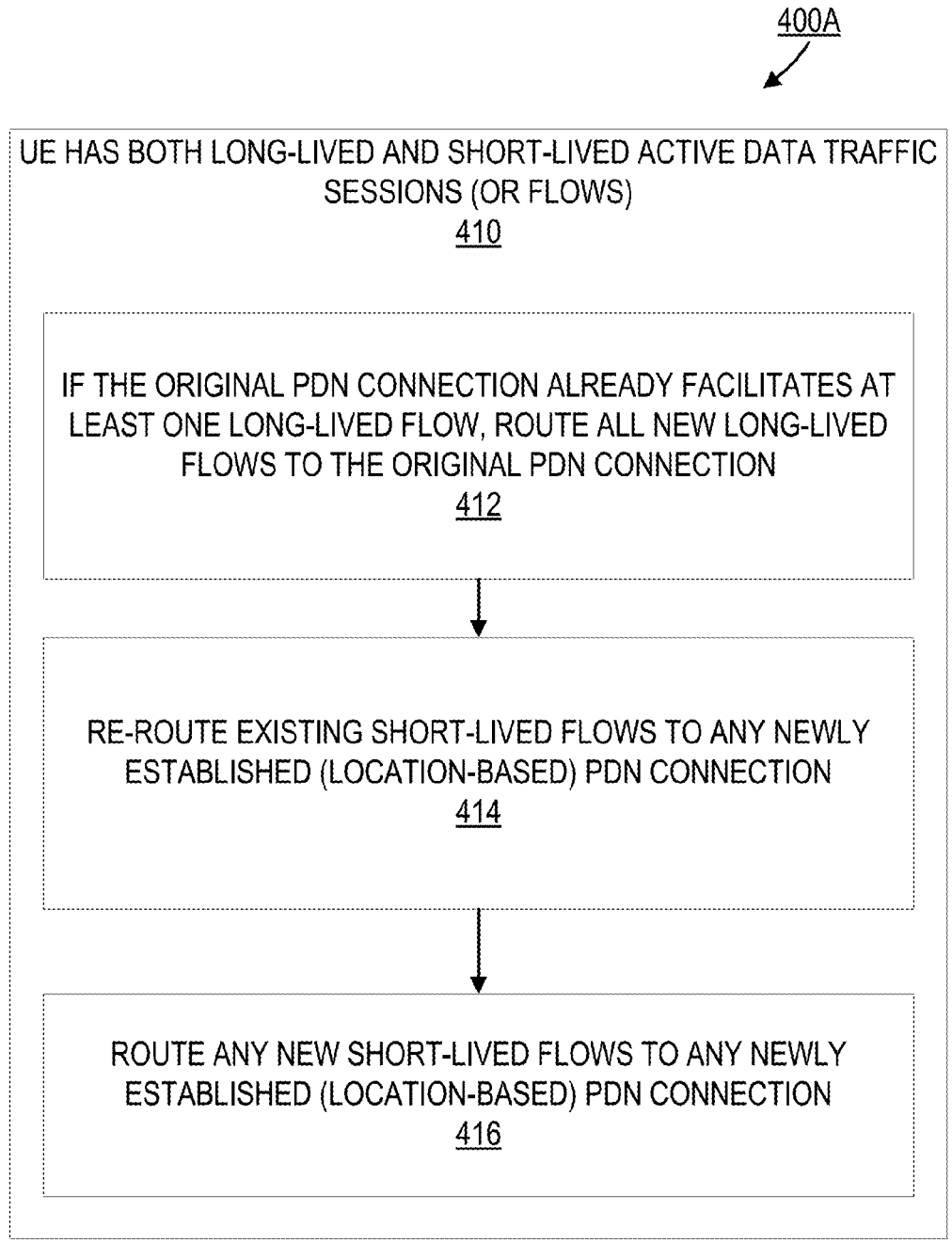
Figure 4B:
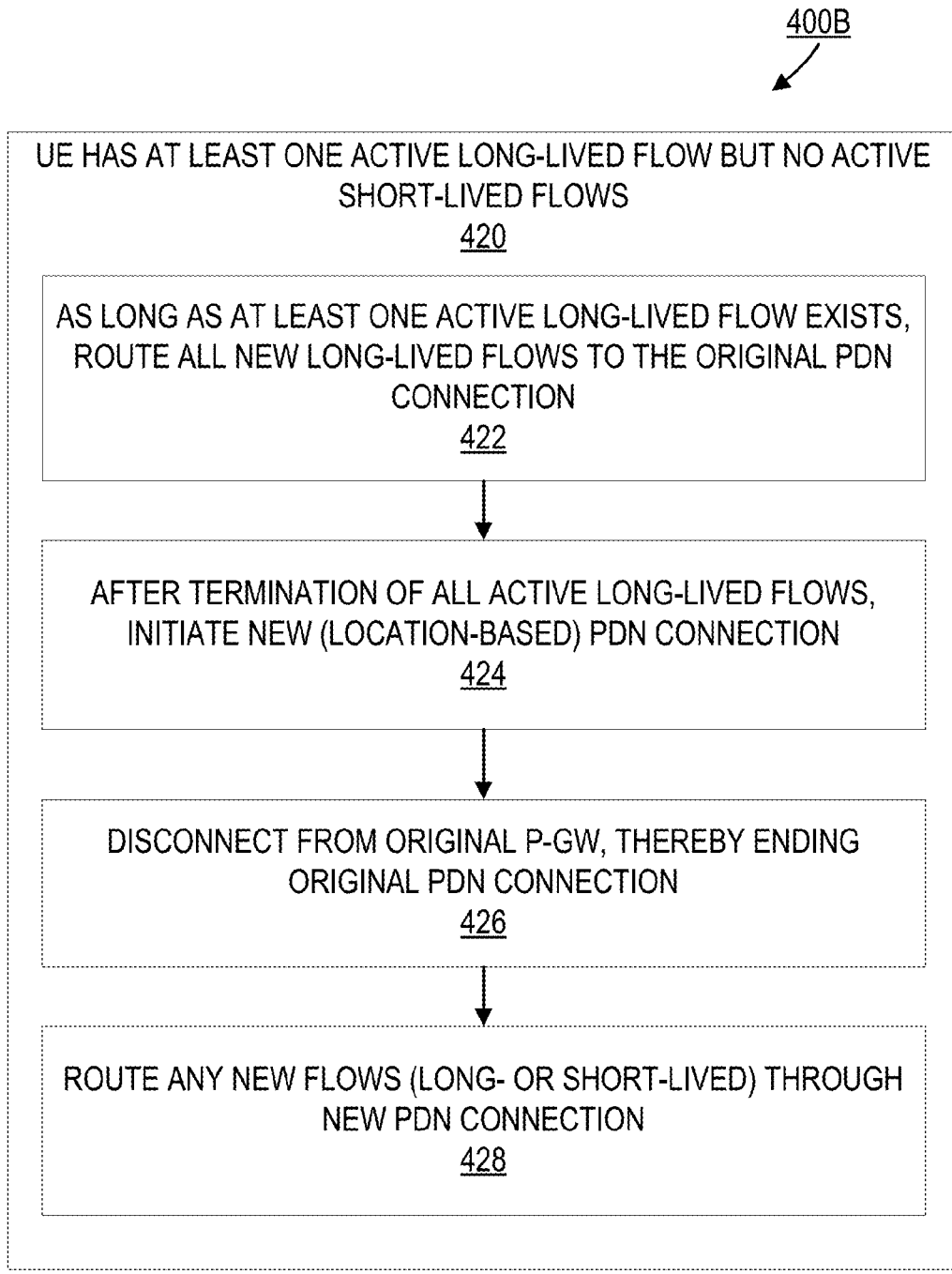

Having thus described embodiments of the invention in general terms, reference will now be made to the accompanying drawings, where:

FIG. 1 illustrates a cellular network environment 100 in which user equipment operates according to embodiments of the invention;

FIG. 2 illustrates an environment 200 wherein user equipment devices and network systems operate according to embodiments of the invention;

FIG. 3 is a flowchart illustrating a method 300 for routing traffic in a packet data network (PDN) according to embodiments of the invention; and FIGS. 4A and 4B are flowcharts illustrating methods 400A and 400B for routing traffic in a packet data network (PDN) according to embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

The Selective IP Traffic Offload (SIPTO) feature defined in 3GPP Rel10 specifications allows the operator to re-establish a packet data network (PDN) connection to a new PDN gateway (P-GW) that is geographically closer to the current UE location. By engaging this SIPTO feature, the user may optimize the load balancing of the network. The SIPTO feature releases or ends the original PDN connection and establishes a new PDN connection to the same PDN. However, the use of a new P-GW (typically geography based) results in assignment of a new IP address. This means that IP address continuity is broken and any ongoing IP services may be disrupted. Further, changing the IP address has differing effects on short-lived flows versus long-lived flows. Regarding short-lived flows, the user may not notice a change, but regarding long-lived flows, the effect may be a poor user experience such as the user being disconnected from a session such as a VoLTE call or data streaming session.

One solution to these problems is to establish a new PDN connection to the new P-GW that is geographically proximate the UE, while keeping the original PDN connection to the original P-GW active. In such a scenario, all new flows are routed to the new PDN connection, while the existing long-lived flows remain routed through the original PDN connection to the original P-GW. Retaining routing for the original long-lived flows ensures service continuity for the long-lived flows. The PDN connection to the original P-GW is released only when all the long-lived flows routed through the original PDN connection have expired. However, one drawback to this solution is that all new flows are routed through the new PDN connection to the new P-GW regardless of whether the flow is short-lived or long-lived. This results in multiple PDN connections to multiple P-DWs while the UE may be moving between multiple different cluster areas. Further any new long-lived flow may be started and routed to a different P-GW and PDN connection.

In order to overcome such deficiencies, all new long-lived flows that require IP address continuity may be routed to only one PDN connection. Thus, the UE will never route any long-lived flow to more than one P-GW while moving among several cluster areas.

Embodiments of the invention are directed to systems, methods and computer program products for routing traffic in a packet data network (PDN). A method includes determining whether the mobile device has an active long-lived data traffic session over an original PDN connection between the mobile device and a first PDN gateway (P-GW); if the mobile device has an active long-lived data traffic session, then routing any new long-lived data traffic session over the original PDN connection; and if the mobile device does not have an active long-lived data traffic session, then routing any new long-lived data traffic session over a location-based PDN connection established based at least in part on a current location of the mobile device. In other words, the mobile device initiates and maintains all long-lived data sessions (for which service continuity is essential) to only one PDN connection. Accordingly, embodiments of the invention may effectively reduce cost and better maintain resources in the network.

In some embodiments, the UE and/or network receive and/or determine location information associated with a UE. The location information may include current location data indicating the location of the UE, speed data indicating a current speed of the UE and movement direction data indicating a current direction of movement of the UE. The UE and/or network may determine a location of the mobile device based on the location information, and determine a cluster and its corresponding P-GW based on the determined location of the UE.

Referring now to FIG. 1, a diagram illustrates a scenario wherein user equipment, such as user equipment 120 moves from Cluster A to Cluster B to Cluster C. Thus, the UE moves from geographic areas corresponding to P-GW1, P-GW2 and P-GW3, respectively. The UE may have an ongoing long-lived flow through a PDN connection through S-GW1 and P-GW1 when the UE moves from Cluster A to Cluster B. The ongoing long-lived flow, once the UE is in Cluster B, will be routed through S-GW2 and remain routed through P-GW1. While the long-lived flow continues, any additional long-lived flow will be routed through the PDN connection through S-GW2 to P-GW1 in order to maintain IP address and session continuity. In some cases, however, when the UE moves into Cluster B, when a new short-lived flow is initiated, it may be routed through a new PDN connection through S-GW2 and P-GW2. Further, if the UE had any ongoing short-lived flows when the UE moved from Cluster A to Cluster B, such flows may be re-routed to the new PDN connection through S-GW2 and P-GW2.

Referring now to FIG. 2, a network environment 200 is illustrated in accordance with one embodiment of the present invention. As illustrated in FIG. 2, the network system 208 is operatively coupled, via a network 201 to the user equipment 204 and/or 206. In this configuration, the network system 208 may send information to and receive information from the user equipment devices 204 and/or 206. The network system 208 may be or include one or more network base stations or other network components. FIG. 2 illustrates only one example of an embodiment of a network environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), a telecommunication network or any other type of network or combination of networks. The network 201 may provide for wireline, wireless, or a combination wireline and wireless communication between devices on the network 201.

In some embodiments, the users 202 and 205 are individuals who maintain cellular products with one or more providers.

As illustrated in FIG. 2, the network system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201. As such, the communication device 246 generally comprises a modem, server, or other device for communicating with other devices on the network 201.

As further illustrated in FIG. 2, the network system 208 comprises computer-readable instructions 254 stored in the memory device 250, which in one embodiment includes the computer-readable instructions 254 of an application 258. In some embodiments, the memory device 250 includes data storage 252 for storing data related to and/or used by the application 258. The application 258 may route traffic in a PDN by performing one or more of the steps and/or sub-steps discussed herein.

As illustrated in FIG. 2, the user equipment 206 generally comprises a communication device 236, a processing device 238, and a memory device 240. The processing device 238 is operatively coupled to the communication device 236 and the memory device 240. In some embodiments, the processing device 238 may send or receive data from the user equipment 204, and/or the network system 208 via the communication device 236 over a network 201. As such, the communication device 236 generally comprises a modem, server, or other device for communicating with other devices on the network 201.

As further illustrated in FIG. 2, the user equipment 206 comprises computer-readable instructions 242 stored in the memory device 240, which in one embodiment includes the computer-readable instructions 242 of an application 244. In the embodiment illustrated in FIG. 2, the application 244 allows the user equipment 206 to be linked to the network system 208 to communicate, via a network 201. The application 244 may also allow the user equipment 206 to connect directly (i.e., locally or device to device) with the user equipment 204 for proximity services (e.g., using either cellular based links or non-cellular based links). The application 244 may route traffic in a PDN by performing one or more of the steps and/or sub-steps discussed herein. Applications 258 and 244 may work independently of one another or may collaborate in order to route traffic in a PDN as discussed herein. For example, application 258 may send base station signal strength information to the network and application 244 may receive the information and make a determination whether to handover the UE 206 connection to the network system 208.

It is understood that the servers, systems, and devices described herein illustrate one embodiment of the invention. It is further understood that one or more of the servers, systems, and devices can be combined in other embodiments and still function in the same or similar way as the embodiments described herein.

Referring now to FIG. 3, a flowchart illustrates a method 300 for routing traffic in a PDN according to embodiments of the invention. The first step, represented by block 302, is to direct (i.e., route) all new long-lived data traffic sessions (i.e., flows) to only one PDN connection. The next step, represented by block 304, is to retain all active long-lived data traffic session over only one PDN connection. The PDN connection is typically the same PDN connection for steps 302 and 304.

The overarching method steps described with reference to FIG. 3 are generally common to most or all the embodiments of the invention. However, embodiments of the invention have differing implementations depending on the state of the UE when the method is implemented. In other words, depending on whether a particular UE has any long-lived flows, short-lived flows or neither, embodiments of the invention may be implemented differently.

Referring now to FIGS. 4A and 4B, different status scenarios are addressed according to embodiments of the invention.

Referring specifically to FIG. 4A, a scenario where the UE has both a long-lived and a short-lived active flow, as represented by block 410, is illustrated according to embodiments of the invention. The first step for the UE, represented by block 412, if the original PDN connection already facilitates at least one long-lived flow, is to route all new long-lived flows to the original PDN connection. Next, as represented by block 414, the UE re-routes existing short-lived flows to any newly established PDN connection. Such a newly established PDN connection may be location-based.

For example, when a UE travels from one cluster to another cluster, as described above with reference to FIG. 1, the corresponding P-GW changes. The UE may establish a connection with a new P-GW when entering a new cluster. Thus, any pre-existing short-lived flows may be transferred to the new P-GW. As represented by block 416, the UE then routes any new short-lived flows to any newly established PDN connection. The UE typically retains the original PDN connection so long as any pre-existing or original long-lived flow is active. Any long-lived flow that is initiated while the UE still has at least one active long-lived flow operating through the original connection will likewise be routed through the original connection. Once all long-lived flows operating through the original PDN connection have expired, the UE may then disconnect from the original P-GW, thereby eliminating the original PDN connection. Any subsequent long-lived flow may be initiated over the newly established PDN connection through the new P-GW.

Referring now to FIG. 4B, a scenario wherein a UE has at least one active long-lived flow but no active short-lived flows, as represented by block 420, is illustrated according to embodiments of the invention. The first step, represented by block 422 is that, as long as at least one active long-lived flow exists, the UE routes all new long-lived flows to the original PDN connection. Next, as represented by block 424, after termination of all active long-lived flows, the UE initiates a new PDN connection. The new PDN connection may be location-based. Next, as represented by block 426, the UE disconnects from the original P-GW, thereby ending the original PDN connection. Finally, as represented by block 428, the UE routes any new flows, whether they are long- or short-lived flows, through the new PDN connection through the new P-GW.

Referring back to FIG. 1, a more detailed example use case of some embodiments of the invention is provided. A user may be sitting on a train and is engaged in a conference call on a conference bridge. The conference call is considered a long-lived flow service for which service continuity is essential. While riding on the train, the user moves from Cluster A to Cluster B. The user's UE establishes a new PDN connection to P-GW2, but the UE maintains the conference call on the original PDN connection through S-GW2 and P-GW1. The UE moves any existing or new short-lived flows to the new PDN connection through S-GW2 and P-GW2. Then, the user starts a streaming session (which is considered a long-lived flow for which service continuity is essential) while continuing to participate in the conference call. The UE directs the streaming session to the original PDN connection through the S-GW2 and P-GW1 in order to keep both the long-lived flows operating over the same PDN connection.

Then, the user moves from Cluster B to Cluster C while riding on the train. The UE then establishes a third PDN connection to P-GW3, but maintains the conference call and the streaming session on the original PDN connection through S-GW-3 and P-GW1. However, the UE moves all new (and in some embodiments existing) short-lived flows from S-GW2/P-GW2 to S-GW3/P-GW3. The UE releases the PDN connection through P-GW2.

Once the user ends both the conference call and the streaming session, the UE releases the PDN connection through P-GW1. Any subsequent long-lived flows would then be connected through S-GW3/P-GW3 (or whatever PDN gateway corresponds to the location of the UE).

One or more of the periods of time referred to herein may be predetermined periods of time.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for routing traffic in a packet data network (PDN), the method comprising:
   determining, by a mobile device, whether the mobile device has an active data traffic session that requires network service continuity over an original PDN connection between the mobile device and a first PDN gateway (P-GW);
   if the mobile device has an active data traffic session that requires network service continuity, then routing any new data traffic session that requires network service continuity over the original PDN connection; and
   if the mobile device does not have an active data traffic session that requires network service continuity, then routing any new data traffic session that requires network service continuity over a location-based PDN connection established based at least in part on a current location of the mobile device.

2. The method of claim 1, further comprising:
   determining, by the mobile device, location information including location data indicating the current location of the mobile device;
   determining, by the mobile device, a second PDN gateway (P-GW) corresponding to the determined current location of the mobile device;
   determining, by the mobile device, that an active data traffic session that is not dependent on network service continuity over the original PDN connection exists;
   initiating connecting, by the mobile device, the mobile device to the second P-GW, thereby resulting in the location-based PDN connection; and
   re-routing the active data traffic session that is not dependent on network service continuity over the location-based PDN connection.

3. The method of claim 2, further comprising:
   as long as the mobile device has an active data traffic session that requires network service continuity over the original PDN connection, routing, by the mobile device, any new data traffic session that requires network service continuity over the original PDN connection.

4. The method of claim 1, further comprising:
determining, by the mobile device, location information including location data indicating the current location of the mobile device;
determining, by the mobile device, a second PDN gateway (P-GW) corresponding to the determined current location of the mobile device;
determining, by the mobile device, that a data traffic session that is not dependent on network service continuity over the cellular network will be initiated by the mobile device within a period of time;
initiating connecting, by the mobile device, the mobile device to the second P-GW, thereby resulting in the location-based PDN connection; and
routing the data traffic session that is not dependent on network service continuity over the location-based PDN connection.

5. The method of claim 4, further comprising:
as long as the mobile device has an active data traffic session that requires network service continuity over the original PDN connection, routing, by the mobile device, any new data traffic session that requires network service continuity over the original PDN connection.

6. The method of claim 4, further comprising:
determining, by the mobile device, that the mobile device does have an active data traffic session that requires network service continuity over the original PDN connection;
determining, by the mobile device, that a new data traffic session that requires network service continuity will be initiated by the mobile device within a second period of time; and
in response to determining that the new data traffic session that requires network service continuity will be initiated and that the mobile device has an active data traffic session that requires network service continuity over the original PDN connection, routing the new data traffic session that requires network service continuity over the original PDN connection.

7. The method of claim 6, further comprising:
determining, by the mobile device, second location information including location data indicating a second current location of the mobile device;
determining, by the mobile device, a third PDN gateway (P-GW) corresponding to the determined second current location of the mobile device;
determining, by the mobile device, that a second data traffic session that is not dependent on network service continuity over the cellular network will be initiated by the mobile device within a third period of time;
initiating connecting, by the mobile device, the mobile device to the third P-GW, thereby resulting in a second location-based PDN connection; and
routing the second data traffic session that is not dependent on network service continuity over the second location-based PDN connection.

8. The method of claim 7, further comprising:
re-routing the data traffic session that is not dependent on network service continuity over the second location-based PDN connection; and
disconnecting, by the mobile device, from the second P-GW, thereby ending the location-based PDN connection.

9. The method of claim 8, further comprising:
determining, by the mobile device, that both the active data traffic session that requires network service continuity and the new data traffic session that requires network service continuity have been terminated; and
disconnecting, by the mobile device, from the first P-GW, thereby ending the original PDN connection.

10. The method of claim 9, further comprising:
routing, by the mobile device, any new data traffic session that requires network service continuity or data traffic session that is not dependent on network service continuity over the second location-based PDN connection.

11. The method of claim 1, further comprising:
as long as the mobile device has an active data traffic session that requires network service continuity over the original PDN connection, routing, by the mobile device, any new data traffic session that requires network service continuity over the original PDN connection.

12. A mobile device comprising:
a memory;
a processor; and
a module stored in the memory for routing traffic in a packet data network (PDN), the module executable by the processor, and configured to:
determine whether the mobile device has an active data traffic session that requires network service continuity over an original PDN connection between the mobile device and a first PDN gateway (P-GW);
if the mobile device has an active data traffic session that requires network service continuity, then route any new data traffic session that requires network service continuity over the original PDN connection; and
if the mobile device does not have an active data traffic session that requires network service continuity, then route any new data traffic session that requires network service continuity over a location-based PDN connection established based at least in part on a current location of the mobile device.

13. The mobile device of claim 12, wherein the module is further configured to:
determine location information including location data indicating the current location of the mobile device;
determine a second PDN gateway (P-GW) corresponding to the determined current location of the mobile device;
determine that an active data traffic session that is not dependent on network service continuity over the original PDN connection exists;
initiate connecting the mobile device to the second P-GW, thereby resulting in the location-based PDN connection; and
re-route the active data traffic session that is not dependent on network service continuity over the location-based PDN connection.

14. The mobile device of claim 13, wherein the module is further configured to:
as long as the mobile device has an active data traffic session that requires network service continuity over the original PDN connection, routing, by the mobile device, any new data traffic session that requires network service continuity over the original PDN connection.

15. The mobile device of claim 12, wherein the module is further configured to:
determine location information including location data indicating the current location of the mobile device;
determine a second PDN gateway (P-GW) corresponding to the determined current location of the mobile device;

determine that a data traffic session that is not dependent on network service continuity over the cellular network will be initiated by the mobile device within a period of time;
initiate connecting the mobile device to the second P-GW, thereby resulting in the location-based PDN connection; and
route the data traffic session that is not dependent on network service continuity over the location-based PDN connection.

16. The mobile device of claim 15, wherein the module is further configured to:
as long as the mobile device has an active data traffic session that requires network service continuity over the original PDN connection, route any new data traffic session that requires network service continuity over the original PDN connection.

17. A computer program product for routing traffic in a packet data network (PDN), the computer program product comprising:
a non-transitory computer-readable medium comprising a set of codes for causing a computer to:
determine whether the mobile device has an active data traffic session that requires network service continuity over an original PDN connection between the mobile device and a first PDN gateway (P-GW);
if the mobile device has an active data traffic session that requires network service continuity, then route any new data traffic session that requires network service continuity over the original PDN connection; and
if the mobile device does not have an active data traffic session that requires network service continuity, then route any new data traffic session that requires network service continuity over a location-based PDN connection established based at least in part on a current location of the mobile device.

18. The computer program product of claim 17, wherein the set of codes further causes a computer to:
determine location information including location data indicating the current location of the mobile device;
determine a second PDN gateway (P-GW) corresponding to the determined current location of the mobile device;
determine that an active data traffic session that is not dependent on network service continuity over the original PDN connection exists;
initiate connecting the mobile device to the second P-GW, thereby resulting in the location-based PDN connection; and
re-route the active data traffic session that is not dependent on network service continuity over the location-based PDN connection.

19. The computer program product of claim 18, wherein the set of codes further causes a computer to:
as long as the mobile device has an active data traffic session that requires network service continuity over the original PDN connection, routing, by the mobile device, any new data traffic session that requires network service continuity over the original PDN connection.

20. The computer program product of claim 17, wherein the set of codes further causes a computer to:
determine location information including location data indicating the current location of the mobile device;
determine a second PDN gateway (P-GW) corresponding to the determined current location of the mobile device;
determine that a data traffic session that is not dependent on network service continuity over the cellular network will be initiated by the mobile device within a period of time;
initiate connecting the mobile device to the second P-GW, thereby resulting in the location-based PDN connection;
route the data traffic session that is not dependent on network service continuity over the location-based PDN connection; and
as long as the mobile device has an active data traffic session that requires network service continuity over the original PDN connection, route any new data traffic session that requires network service continuity over the original PDN connection.

* * * * *